United States Patent [19]

Lange

[11] 4,081,427

[45] Mar. 28, 1978

[54] SOLVENTLESS ELECTRICAL INSULATION RESINS

[75] Inventor: Daniel J. Lange, St. Louis, Mo.

[73] Assignee: The P. D. George Company, St. Louis, Mo.

[21] Appl. No.: 534,681

[22] Filed: Dec. 20, 1974

[51] Int. Cl.$^2$ .................. C08G 63/68; C08G 63/20
[52] U.S. Cl. ............................. 260/75 N; 428/379
[58] Field of Search .............. 260/75 T, 75 N, 78 TF

[56] References Cited

U.S. PATENT DOCUMENTS

| | | | |
|---|---|---|---|
| 3,211,585 | 10/1965 | Meyer et al. | 260/75 T |
| 3,272,785 | 9/1966 | Lewis et al. | 260/75 T |
| 3,310,512 | 3/1967 | Curtice | 260/75 T |
| 3,426,098 | 2/1969 | Meyer et al. | 260/75 N |
| 3,553,215 | 1/1971 | Zalewski et al. | 260/75 N |
| 3,632,837 | 1/1972 | Koyler et al. | 260/78 TF |
| 3,652,501 | 3/1972 | Albers et al. | 260/75 N |
| 3,668,277 | 6/1972 | Riemhofer et al. | 260/75 N |
| 3,763,269 | 10/1973 | Formaini | 260/75 N |
| 3,882,188 | 5/1975 | Behmel | 260/75 N |
| 3,931,418 | 1/1976 | Risten | 260/75 R X |

*Primary Examiner*—Howard E. Schain
*Assistant Examiner*—W. C. Danison, Jr.
*Attorney, Agent, or Firm*—Sidney B. Ring; Hyman F. Glass

[57] ABSTRACT

This invention relates to a process of reformulating a solvent polyester-type resin, such as employed in electrical insulation, for example in wire enamels, to a solventless polyester-type wire resin of similar properties which is characterized by increasing the relative hydroxy-functionality of said polyester-type resin as compared to the hydroxy-functionality of a corresponding solvent-type wire resin.

In the preferred embodiment the increased hydroxy-functionality, in whole or in part, is derived from the use of, or the increased content, of tris(2-hydroxyethyl) isocyanurate. The polyester-type wire enamels include polyesters and polyesters containing other groups such as polyester-amides, polyester-imides, polyester-amide-imides, etc. By doing this, resins having the desired properties as well as viscosities suitable for wire insulation can be made and applied in solventless systems.

1 Claim, No Drawings

SOLVENTLESS ELECTRICAL INSULATION RESINS

Resins used in electrical insulation such as in wire enamels have conventionally been applied in solution form. Conveniently wire enamel resin solutions having solids content of from 15–45% are employed in coating wire enamels since it was believed that the desired properties can only be obtained in this way. Stated another way, conventional wisdom is that although resins themselves supply the desired properties, it is necessary to employ them in solution form to obtain a suitable coating.

In recent years, solvents have become relatively expensive. Solvents have not only increased the cost but also the bulk of insulating resin, thus increasing costs due to packaging, transport and storage. In addition, the time required for the removal of solvents decreases the rate of wire throughput and the volatilization of solvents to the air is a source of pollution. The importance of pollution control cannot be overemphasized.

British Pat. No. 1,263,022 describes a solventless process for insulating electrical conductors which can be summarized in the broadest claim as follows:

"A process for the insulation of an electrical conductor with a thermosetting non-linear polyester type resin or resin mixture comprising the steps of passing the conductor at least once through a molten mass of said resin or resin mixture maintained at a temperature of between 80° and 250° C. in a heatable enclosed varnishing chamber, and subsequently curing the resin deposited on said conductor at a higher temperature, said resin or resin mixture having a viscosity at 250° C. which is below 8000 cP."

This British Patent process employs in essence a resin similar to the solvent-type resin except at a lower polymerization state.

I have now discovered a method of reformulating a solvent-type thermosetting polyester-type resin to a solventless-type polyester-type resin of similar properties which comprises increasing the relative hydroxy-functionality of a polyester-type resin in the wire enamel as compared to the hydroxy-functionality of the corresponding solvent-type wire enamel.

In the preferred embodiment, the increased hydroxy-functionality is derived, in part, from the presence, or increased amounts, of tris(2-hydroxyethyl) isocyanurate.

Stated another way, a solvent-type polyester-type resin having certain properties when applied to an electrical insulation in conventional solution form can be converted to a solventless-type polyester-type resin giving similar properties when applied to an electrical insulation in a solventless form. The term polyester-type resin includes polyester resins per se or polyester resins containing other groups, e.g., polyester-amide, polyester-imides, polyester-amide-imide, etc.

The increase in hydroxy-functionality will vary widely, depending on many factors such as, for example, the particular formulation, the degree of polymerization, the desired properties, etc. In general, as compared to the solvent-type polyester-type resin, it is desirable to increase hydroxy-functionality by at least about 10%, such as from about 10 to 55%, for example from about 15 to 45%, but preferably from about 20 to 40%.

The following examples are presented by way of illustration and not of limitation.

EXAMPLES

Two formulations were prepared - (A) a commercial solvent-containing wire enamel, and (B) a solventless wire enamel of the present invention.

| Wire Enamels | | |
|---|---|---|
| Ex. A - Solvent-Type | | Ex. B - Solventless-Type |
| 20.32 Eq. % | Ethylene glycol | 27.00 Eq. % |
| 25.03 | THEIC | 31.00 |
| 21.01 | DMT (Dimethyl terephthalate) | 12.00 |
| 22.41 | TMA (Trimellitic Anhydride) | 20.00 |
| 11.21 | MDA (Methylene diphenylamine) | 10.00 |

These are prepared as follows.

EXAMPLE A

In the solvent process, all reactants are loaded into reactor in the presence of cresylic acid and heated in an inert atmosphere under transesterification conditions to 410°–420° F over a period of about 6 hours to a viscosity of about Z4–Z5, measured at 30% in cresylic acid (8000 cps.). Thereupon the product is thinned with an aromatic solvent to 30% solids and applied to an 18 wire to a build of about 3 mils.

EXAMPLE B

In the solventless process, all reactants are loaded into a reactor (without cresylic acid) and heated in an inert atmosphere to a temperature of 380°–390° F over a period of about 4 hours to a viscosity of J-K when measured at 30% solids in cresylic acid (268 cps).

The solventless-type is applied to an 18 gauge wire to a build of about 3 mils in a fused solventless state.

The solvent-type wire enamel (A) is applied to a magnet wire in the conventional solid content of 30% in a cresylic acid-aromatic hydrocarbon solvent.

The solventless wire enamel (B) is applied to a magnet wire as 100% solids at 150° C, at which temperature the resin was molten and has a viscosity of 5000 cps. It is applied by passing the wire through a heatable enclosed varnishing chamber having an opening and exit for the wire.

The properties of the wire enamel prepared from A and B are similar.

Examples A and B illustrate the application of this invention to the polyesterimide resin. The polyester resins of U.S.P. 3,297,785 which are solvent-containing wire enamels are reformulated according to this invention by increasing the hydroxy-functionality by at least 10%, but preferably 20–40%, yield wire enamel formulations which are applied in solventless form.

In general, the viscosity of the resin should be such that a smooth wire enamel having the desired properties can be formed, such as a resin viscosity of below about 8000 cps at a temperature of 250° C or lower, but preferably at 200° C or lower. Preferably the resin should possess a viscosity of about 5000 cps or lower and most preferably from about 1000 to 4000 cps at between about 80 to 250° C.

Isocyanurates are compounds of the formula

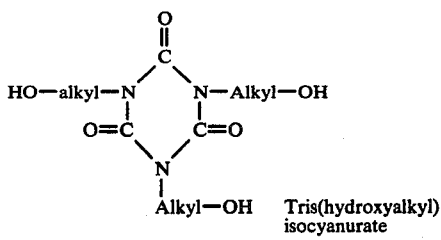

These isocyanurates are conveniently prepared as follows:

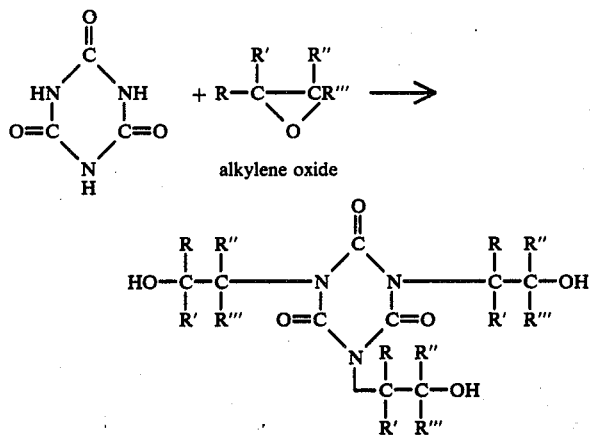

where the R's are preferably hydrogen or an alkyl group, for example where the alkylene oxide is ethylene, propylene, butylene, octylene, etc. oxides.

The commercial isocyanurate employed for purposes of illustration is tris(2-hydroxethyl isocyanurate) having the formula

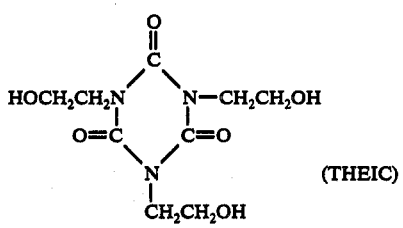

In general, polyester resins are prepared from (1) polycarboxylic acids, esters, etc., (2) glycols and (3) polyols, preferably where the resin contains THEIC.

Furthermore, the polyester resins contain conventional cross-linking agents, such as for example polyisocyanates including the blocked isocyanates of the Mondur type (Mobay Chem. Co.).

Polyesters also include polyester-amides, polyester-amide-imides, polyester-imides, for example such resins prepared from dicarboxylic acids such as phthalic acids, etc., tricarboxylic acids such as trimellitic acid, etc., and tetracarboxylic acids such as pyromellitic acids, etc. reacted with polyamines such as diamines, hydroxyamines, such as alkanolamines, with or without glycols or polyols.

A wide variety of polycarboxylic acids, or esters thereof can be employed in the preparation of the polyesters of this invention. In general these include the polycarboxylic acids conventionally employed in the preparation of polyesters. These acids may possess two, three, four or more carboxyl groups, may be aliphatic, alicyclic, heterocyclic, aromatic, etc., and may be saturated or unsaturated. Examples of such acids include the alkanedicarboxylic acids, for example those of the formula

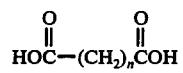

where $n = 1-10$ or more such as malonic, succinic, glutaric, adipic, pimelic, suberic, azelaic, sebacic, etc., acids, isomers thereof where the alkylene group is branced and/or one or more of the carboxyl groups is not terminal; substituted alkanedicarboxylic acids such as chlorosuccinic, etc.; alicyclic dicarboxylic acids, such as cyclohexanedicarboxylic acid, etc.; aromatic acids such as phthalic, isophthalic, terephthalic, diphenic, hemimellitic, trimellitic, 1,8-napthalenic acid, pyromellitic acids, benzophenone dicarboxylic acid, dichlorophthalic acids; unsaturated acids such as fumaric, maleic, muconic, citraconic, mesaconic, glutaconic (cis and trans), aconitic (cis and trans), bromomaleic, etc.; hydroxyacids such as citric, malic, tartaric, etc. acids; dimeric fatty acids such as dilinoleic acids, etc.; tris-(2-carboxyethyl) isocyanurate; adducts of maleic acids with various unsaturated and/or conjugated hydrocarbons such as diisobutylene, butadiene, rosin, abietic acid, terpolene, cyclopentadiene, linoleic acid, etc.; diglycollic acid, ethylenebisdiglycollic acid, etc.

The preferred polycarboxylic acids are the dicarboxylic acids containing from 2 to 10 carbon atoms, such as succinic, glutaric, adipic, suberic, maleic, phthalic, isophthalic, terephthalic, and the like. Particularly preferred polycarboxylic acids are the aromatic dicarboxylic acids, containing from 6 to 10 carbon atoms wherein the two carboxylic groups are attached directly to the aromatic nucleus such as the phthalic acids, but most preferably isophthalic and terephthalic acids.

In some cases it may be desirable to utilize other forms of the acids, such as the acid anhydrides or acid chlorides, such as phthalic anhydride, maleic anhydride, trimellitic anhydride, pyromellitic anhydride, succinic chloride, and the like.

The esters of the polybasic acids may be utilized where the resins are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, propyl alcohol, butyl alcohol and amyl alcohol.

The glycol employed in preparing the resins can vary widely. In general, they are the glycols conventionally employed in preparing polyesters. Suitable examples include the following: alkylene glycols of the formula $H(OA)_nOH$ where $n$ is for example 1-10 or higher and A is alkylene; ethylene; propylene, butylene, etc., for example ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, xylylene glycol, etc. Preferably, one employs an alkane-diol of the general formula $HO(CH_2)_nOH$ where $n=2-5$ or isomers thereof. The preferred glycol is ethylene glycol.

The polyols used in the preparation of the resins of this invention can vary widely and are those containing at least three esterifiable hydroxyl groups. In general, these are the polyhydric alcohol conventionally employed in preparing polyesters. Illustrative examples of such alcohols are glycerol, polyglycerol, pentaerythritol, mannitol, trimethylopropane, trimethylolethane, 1,2,6-hexanetriol, polypentaerythritol, polyallyl alcohol, polymethallyl alcohol, tris(2-hydroxyethyl)-isocyanurate (THEIC), polyols formed by the condensation of bisphenols with epichlorohydrin, and the like.

Preferred polyhydric alcohols to be used in the preparation of these polyesters are the aliphatic alcohols possessing from 3 to 6 hydroxyl groups and containing from 3 to 14 carbon atoms, such as glycerol, pentaerythritol, mannitol, 1,4,6-octanetriol, 1,3,5-hexanetriol and 1,5,10-dodecanetriol. Other preferred alcohols include THEIC.

It should be understood that mixtures of more than one polycarboxylic acid, more than one glycol and more than one polyol can be employed.

The ratio of (1) polycarboxylic acids to (2) glycols to (3) polyols can vary widely depending on many variables such as the specific compounds employed, the intended use, the modifying agents, etc.

For example, the polyester can comprise the product of (1) from about 20 to 65 equivalent percent, such as from about 20 to 55% but preferably from about 25 to 40% of a polycarboxylic acid; (2) from about 10 to 60 equivalent percent, such as from about 15 to 55% but preferably from about 30 to 40% of a glycol; and (3) from about 10 to 75 equivalent percent, such as from about 15 to 60%, but preferably from about 30 to 55% of a polyol. The sum of (1), (2) and (3) above equals 100 equivalent percent.

In the preferred specific polyester of the present invention where a phthalic acid, preferably iso- or terephthalic acids, THEIC and a glycerol and/or ethylene glycol are reacted.

In addition to polyester resins, one can also employ prepared polyamide-polyester resins, polyimide-polyester resins, polyamide-polyimide-polyester resins. For example, when tetracarboxylic acids are reacted with a polyamine there are formed polymers of the formula:

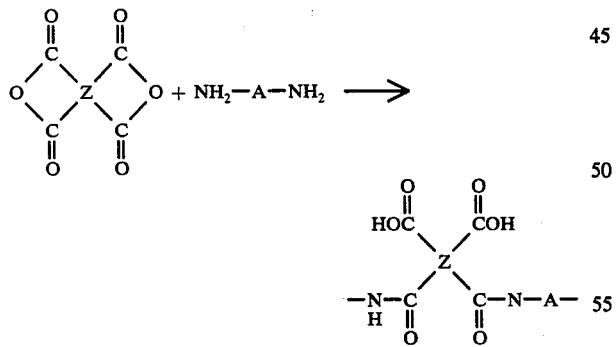

which react further at higher temperatures to form polyimides, for example

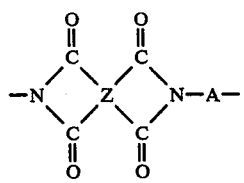

Similarly when tricarboxylic acids react with polyamines, polyimide-amides are formed, for example

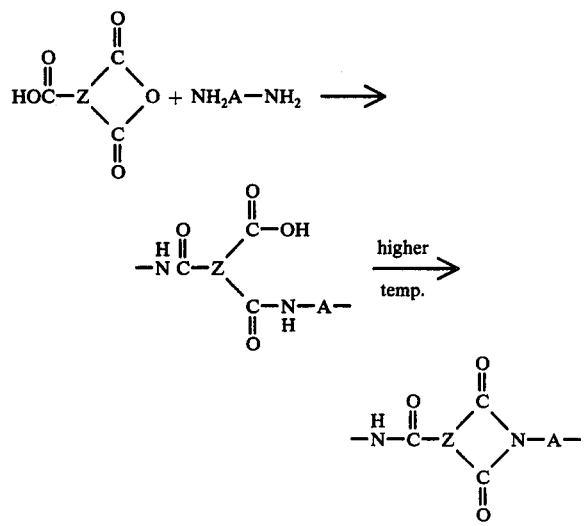

where Z is the moiety of the polycarboxylic acid, such as aliphatic, cycloaliphatic, arylic, etc., but preferably arylic; and A is the moiety of the polyamine, for example, aliphatic, cycloaliphatic, arylic, etc., but preferably arylic. THEIC can also be employed to modify these resins.

The tetracarboxylic acid dianhydrides useful in this invention are characterized by the following formula:

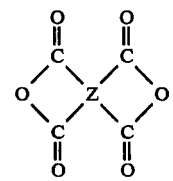

where Z is a tetravalent radical, e.g., aromatic, aliphatic, cyclo-aliphatic, combination of aromatic and aliphatic, or substituted group thereof. The preferred dianhydrides are those in which the Z groups have at least 6 carbon atoms characterized by benzenoid unsaturation, wherein each of the 4 carbonyl groups of the dianhydride are attached to a separate carbon atom in the tetravalent radical, the carbonyl groups being in pairs in which the groups in each pair are attached to adjacent carbon atoms of the R radical to provide a 5-membered ring as follows:

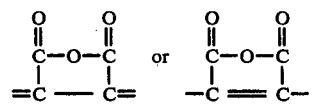

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; benzophenone tetracarboxylic dianhydride, 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl) sulfone dianhydride; perylene 3,4,9,10-tetracarboxylic acid dianhydride; bis(3,4-dicarboxyphenyl) ether dianhydride;

bis(3,4-dicarboxyphenyl) sulfone dianhydride; bis(3,4-dicarboxyphenyl) sulfone dianhydride and ethylene tetracarboxylic acid dianhydride.

Although trimellitic acid or its anhydride (TMA) is the preferred tricarboxylic acid, other suitable tricarboxylic acids or anhydrides can be employed, for example

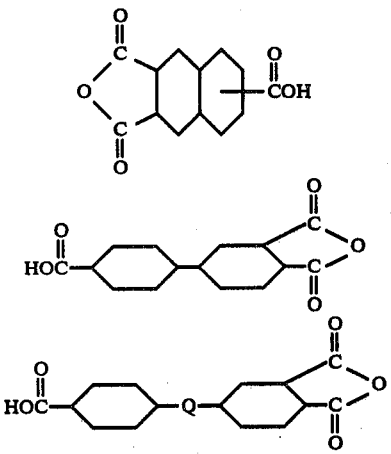

where Q is for example alkylene such as

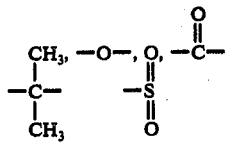

etc.

The organic diamines usable in preparing imides and/or amides are those having the structural formula H₂N—A—NH₂, wherein A, a divalent radical containing at least two carbon atoms, may be aromatic, aliphatic cycloaliphatic, a combination of aromatic and aliphatic or substituted groups thereof, etc. The most useful diamines are the primary diamines which, upon reaction with the trifunctional acids may provide polyamideimides. The preferred A groups in these diamines are those containing at least six carbon atoms and characterized by benzenoid unsaturation. More specifically these groups are:

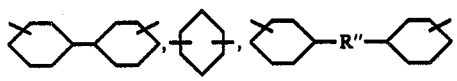

and the like, where R" is hydrocarbon, nitrogen-containing, oxygen-containing, silicon-containing, phosphorus-containing, sulphur-containing, etc.

Among the diamines which are suitable for use in the present invention are:
4,4'-diamine-diphenyl propane;
4,4'-diamino-diphenyl methane;
benzidine;
3,3'-dichloro-benzidine;
4,4'-diaminodiphenyl sulfide;
3,3'-diamino-diphenyl sulfone;
4,4'-diamino-diphenyl sulfone;
4,4'-diamino-diphenyl ether;
1,5-diamino-naphthalene;
meta-phenylene-diamine;
para-phenylene-diamine;
3,3'-dimethyl-4,4'-biphenyl diamine;
3,3'-dimethoxy benzidine;
bis-(beta-amino-t-butyl) toluene;
bis(para-beta-amino-t-butyl-phenyl) ether;
bis(para-beta-methyl-delta-amino-pentyl) benzene;
bis-para(1,1-dimethyl-5-amino-pentyl) benzene;
1-isopropyl-2,4-meta-phenylene diamine;
m-xylylene diamine;
p-xylylene diamine;
di(para-amino-cyclohexyl) methane;
hexamethylene diamine;
heptamethylene diamine;
octamethylene diamine;
nonamethylene diamine;
decamethylene diamine;
diaminopropyl tetramethylene diamine;
3-methylheptamethylenediamine;
4,4-dimethylheptamethylene diamine;
2,11-diaminododecane;
1,2-bis-(e-amino-propoxy) ethane;
2,2-dimethyl propylene diamine;
3-methoxyhexamethylene diamine;
2,5-dimethyl-hexamethylene diamine;
2,5-dimethylheptamethylenediamine;
3-methyl-heptamethylene diamine;
5-methylnonamethylenediamine;
2,11-diamino-dodecane;
2,17-diaminoeicosadecane;
1,4-diamino-cyclohexane;
1,10-diamino-1, 10-dimethyl decane;
1,12-diamino-octadecane;
H₂N(CH₂)₃O(CH₂)₂O(CH₂)₂NH₂;
H₂N(CH₂)₃S(CH₂)₃NH₂;
H₂N(CH₂)₃N(CH₃)(CH₂)₃NH₂;
piperazine. A plurality of the above polyamines can also be employed, for example 2,3,4 or more of these amines, in preparing the polymer.

In addition to diamines one can also employ hydroxyamines HORNH₂ where R is alkylene, cycloalkylene, arylic, etc., for example alkanolamine HO-(CH₂)ₙNH₂ such as ethanolamine, propanolamine, butanolamine.

These polyamines and hydroxyamines can be employed with any of the polycarboxylic acids specified herein including dicarboxylic acids, tricarboxylic acids, tetracarboxylic acids, etc.

These polyamides, polyimides, polyamide-imides, polyamide-esters, etc. can be modified by employing therein other glycols and/or polyols, for example those specified herein.

Trimellitic acid or anhydride can be pre-reacted with various reactants and these products later reacted to form polyesters, polyester-amides, polyester-imides, etc. for example

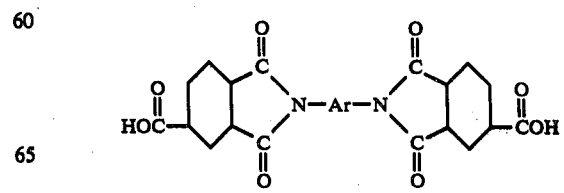

where Ar is an aromatic group, or

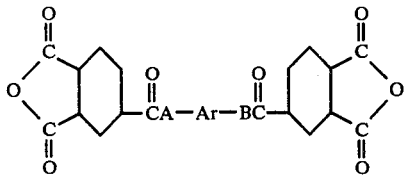

such as described in U.S. Pat. No. 3,182,073, where A and B are

H
O, N, S, etc., and Ar is an aromatic group such as phenyl, naphthyl, etc. These can be further reacted to form esters, ester-amides, ester-imides, etc.

The imide portion of the polyester resin may comprise from about 5 to 40%, but preferably from about 10 to 30% of the polyester.

In order to insure complete curing of the resins of the present invention when applying them to conductors, it is desirable to employ a curing catalyst to accelerate the curing reaction in the resin solutions during the coating operation, although satisfactory results are obtained without the use of such a catalyst. Among the many curing catalysts suitable for this purpose may be the soluble salts of Zn, Pb, Ti, Cd, Bo, Th, etc., for example zinc octoate, cadmium octoate, copper naphthenate, tetraisopropyl titanate, tetrabutyl titanate, etc., aromatic polyisocyanates, aliphatic polyisocyanates, etc. Examples of polyisocyanates are those disclosed in U.S. Pat. No. 3,211,585 including the blocked isocyanates which are by reference incorporated herein as if part hereof. Where metal-containing curing catalysts are employed we have obtained satisfactory results using from about 0.05 to 4.0 or more percent, by weight, of the metal element of the catalyst based on the total resin solids. Preferably, we use sufficient metal-containing catalyst to give about 0.1–2.0 percent metal based on the total resin solids and when using the polyisocyanates we use about 20–25 percent, by weight, of the isocyanate based on the total resin solids present. Where other cross-linking resins are employed such as melamine-aldehyde resins or modified derivatives thereof, one employs about 0.1–10%, such as about 0.25–8%, but preferably about 0.5–4% based on total solids.

Although the invention has been primarily described as a solventless resin, this does not preclude incorporation of less solvent than is normally employed in resin formulations such as about 20% or less solvent, for example 15% or less, but preferably less than about 10%. In addition mixtures of resins can be employed, for example a resin having a higher viscosity can be mixed with a lower viscosity resin so as to achieve the viscosity desired for applying the resins.

Wires insulated with the wire enamels of this invention can be further improved by applying over the enamel layer an overcoat of a highly linear thermoplastic polymer.

The thickness of the outer layer of the linear polymer normally is preferably at least 10% of the thickness of the inner enamel layer but substantially thinner than the inner layer. Such an outer layer improves physical properties, particularly improving heat shock.

For the thermoplastic linear polymer of the outer layer, a polyester resin obtained by reacting a dihydric alcohol with an aromatic dicarboxylic acid is particularly suitable. Preferably, the linear polymer is a glycol-terephthalate polyester of predominantly high molecular weight, such as polyethylene terephthalate known in the trade as "Dacron" or "Mylar." Examples of other such linear polyesters well adapted for this use are polycyclohexylene dimethyleneterephthalate known in the trade as "Kodel" of the fiber-forming type, a polyethylene terephthalate known as "Celanese Polyester Fortrel" (a product of Fiber Industries, Inc.), and a polyethylene terephthalate-isoterephthalate product of Goodyear known as "Vicron." Also suitable for this purpose is a polyaromatic polycarboxylic aromatic imide known as Du Pont's "M-L" for example those disclosed in U.S. Pat. No. 3,179,634 which has good thermal life, and, like the terephthalic base materials, can eliminate heat and solvent shock and meet the other requirements of a higher temperature magnet wire. Other equivalent materials can be employed.

These wire enamels can also be overcoated with the polyamide-imides of Ser. No. 423,331 filed Jan. 4, 1965 which is incorporated herein as part hereof. For example, the present wire enamels may be overcoated with the polyamide-imides of trimellitic anhydride and polyamines such as phenylene diamine. A suitable commercial overcoat is Amoco 1A Type 10. These polyamide-imide overcoats can also be prepared by reacting TMA with disocyanates according to U.S.Pat. No. 3,541,038.

While representative embodiments of this invention have been presented, it will be apparent to those skilled in the art that various changes and modifications may be made without departing from the spirit and scope of the invention.

I claim:

1. A solventless electrical conductor insulating resin for application in molten state to a wire which is a polyester-polyimide derived from 12 equivalent percent of dimethyl terephthalate, 20 equivalent percent of trimellitic anhydride, 27 equivalent percent of ethylene glycol, 31 equivalent percent of tris (2-hydroxyethyl) isocyanurate, and 10 equivalent percent of methylene diphenylamine having a viscosity of not more than 5000 cps at between about 80 to 250° C.

* * * * *